(12) United States Patent
Clauser et al.

(10) Patent No.: US 10,604,040 B2
(45) Date of Patent: Mar. 31, 2020

(54) SEAT FOR A VEHICLE

(71) Applicant: LEAR CORPORATION, Southfield, MI (US)

(72) Inventors: James B. Clauser, Oakland Township, MI (US); Ashley L. Baisch, Washington Township, MI (US); William J. Paruszkiewicz, Jr., Clinton Township, MI (US)

(73) Assignee: LEAR CORPORATION, Southfield, MI (US)

( * ) Notice: Subject to any disclaimer, the term of this patent is extended or adjusted under 35 U.S.C. 154(b) by 237 days.

(21) Appl. No.: 15/604,031

(22) Filed: May 24, 2017

(65) Prior Publication Data
US 2018/0339615 A1 Nov. 29, 2018

(51) Int. Cl.
*B60N 2/58* (2006.01)
*B60N 2/70* (2006.01)
*B60N 2/897* (2018.01)
*B60N 2/80* (2018.01)

(52) U.S. Cl.
CPC ......... *B60N 2/5841* (2013.01); *B60N 2/5825* (2013.01); *B60N 2/70* (2013.01); *B60N 2/897* (2018.02); *B60N 2/80* (2018.02)

(58) Field of Classification Search
CPC ...... B60N 2/5825; B60N 2/5841; B60N 2/70; B60N 2/80; B60N 2/897
See application file for complete search history.

(56) References Cited

U.S. PATENT DOCUMENTS

| 3,586,370 | A | * | 6/1971 | Barecki | A47C 31/02 297/228.11 |
| 3,592,508 | A | * | 7/1971 | Druseikis | B60N 2/853 297/380 |
| 3,647,260 | A | * | 3/1972 | Grant | A47C 7/185 297/229 |
| 3,981,534 | A | * | 9/1976 | Wilton | A47C 7/185 297/218.1 |
| 4,284,305 | A | * | 8/1981 | Porter | A47C 31/023 24/462 |
| 4,390,209 | A | * | 6/1983 | Izuno | A47C 7/38 297/410 |
| 4,545,618 | A | * | 10/1985 | Kitamura | B60N 2/815 297/410 |
| 4,765,683 | A | * | 8/1988 | Hattori | B60N 2/829 297/410 |

(Continued)

FOREIGN PATENT DOCUMENTS

DE 10 2015 205 647 A1 10/2015

*Primary Examiner* — James M Ference
(74) *Attorney, Agent, or Firm* — Brooks Kushman P.C.

(57) ABSTRACT

A seat for a vehicle includes a seatback support structure including a main portion having a first side and a second side disposed opposite the first side, and a flange that projects from the main portion in a direction away from the first side, and that defines a hole extending through the flange for receiving a headrest post. The seat further includes a trim cover disposed over at least a portion of the seatback support structure and a trim fastener attached to the trim cover for securing the trim cover to the flange of the seatback support structure. The trim fastener has two opposing side portions and a cavity therebetween for receiving the flange.

20 Claims, 3 Drawing Sheets

(56) References Cited

U.S. PATENT DOCUMENTS

| | | | | |
|---|---|---|---|---|
| 4,789,201 A * | 12/1988 | Selbert | B60N 2/5825 | 297/218.1 |
| 4,923,250 A * | 5/1990 | Hattori | B60N 2/829 | 297/410 |
| 5,080,437 A * | 1/1992 | Pesta | B60N 2/818 | 297/410 |
| 5,195,222 A * | 3/1993 | Rink | A47C 31/023 | 24/581.1 |
| 5,401,075 A * | 3/1995 | Venuto | A47C 31/023 | 297/218.2 |
| 5,658,046 A * | 8/1997 | Rus | B60N 2/3013 | 16/4 |
| 5,667,276 A * | 9/1997 | Connelly | B60N 2/815 | 297/410 |
| 5,713,634 A * | 2/1998 | Koike | B60N 2/643 | 297/378.13 |
| 5,816,658 A * | 10/1998 | Wallis | B60N 2/815 | 297/410 |
| 5,895,094 A * | 4/1999 | Mori | B60N 2/818 | 297/410 |
| 6,062,645 A * | 5/2000 | Russell | B60N 2/815 | 297/410 |
| 6,454,356 B1 * | 9/2002 | Yamada | B60N 2/815 | 297/410 |
| 6,568,761 B2 * | 5/2003 | Perske | B60N 2/5825 | 297/452.55 |
| 6,817,664 B1 * | 11/2004 | Tang | B60N 2/5825 | 297/219.1 |
| 6,857,699 B2 * | 2/2005 | Ashton | B60N 2/5825 | 297/220 |
| 6,874,854 B2 * | 4/2005 | Terrand | B60N 2/815 | 297/410 |
| 6,994,401 B1 * | 2/2006 | Fischer | A47C 7/725 | 297/146 |
| 7,267,407 B1 * | 9/2007 | Demick | B60N 2/815 | 297/410 |
| 7,401,852 B2 * | 7/2008 | Humer | B60N 2/4228 | 297/216.13 |
| 7,410,219 B2 * | 8/2008 | Kraft | B60N 2/809 | 297/410 |
| 7,581,792 B2 * | 9/2009 | Saberan | B60N 2/888 | 297/452.18 |
| 7,585,025 B2 * | 9/2009 | Welch | B60N 2/80 | 297/218.2 |
| 7,703,855 B1 * | 4/2010 | Kalinowski | B60N 2/809 | 297/452.6 |
| 7,857,383 B2 * | 12/2010 | Nguyen | B60N 2/5825 | 297/218.1 |
| 7,866,689 B2 * | 1/2011 | Saberan | B60N 2/68 | 280/730.2 |
| 8,240,759 B2 * | 8/2012 | Hobl | B60N 2/5825 | 297/218.1 |
| 8,528,984 B2 * | 9/2013 | Galbreath | B60N 2/5825 | 24/297 |
| 8,690,257 B2 * | 4/2014 | Stiller | B60N 2/5825 | 24/297 |
| 8,733,834 B2 * | 5/2014 | Palmer | B60N 2/585 | 297/218.1 |
| 8,911,022 B2 * | 12/2014 | Pleskot | B60N 2/5825 | 297/218.3 |
| 9,126,504 B2 * | 9/2015 | Line | B60N 2/643 | |
| 9,321,382 B2 * | 4/2016 | Fleischheuer | B60N 2/80 | |
| 9,616,790 B2 | 4/2017 | Stankiewicz et al. | | |
| 9,649,963 B2 * | 5/2017 | Line | B60N 2/64 | |
| 9,845,032 B1 * | 12/2017 | Line | B60N 2/5858 | |
| 10,081,282 B2 * | 9/2018 | Line | B60N 2/80 | |
| 2004/0227389 A1 * | 11/2004 | Yoshida | B60N 2/64 | 297/452.18 |
| 2005/0179299 A1 * | 8/2005 | Yetukuri | B60N 2/80 | 297/391 |
| 2008/0001456 A1 * | 1/2008 | Muller | B60N 2/20 | 297/354.1 |
| 2008/0224509 A1 * | 9/2008 | Demick | B60N 2/5825 | 297/218.2 |
| 2010/0156152 A1 * | 6/2010 | Chen | B60N 2/809 | 297/112 |
| 2010/0259079 A1 * | 10/2010 | Matsuzaki | B60N 2/5816 | 297/218.2 |
| 2011/0030438 A1 * | 2/2011 | Maier | B21C 23/06 | 72/254 |
| 2012/0038200 A1 * | 2/2012 | Stankiewicz | B60N 2/5825 | 297/452.59 |
| 2012/0223563 A1 * | 9/2012 | Zimmermann | B60N 2/682 | 297/391 |
| 2012/0280552 A1 * | 11/2012 | Line | B60N 2/809 | 297/440.1 |
| 2014/0145486 A1 * | 5/2014 | Wisniewski | B60N 2/809 | 297/391 |
| 2014/0183913 A1 * | 7/2014 | Hage-Hassan | B60N 2/5825 | 297/218.3 |
| 2014/0183925 A1 * | 7/2014 | Clauser | B60N 2/5825 | 297/452.38 |
| 2015/0306995 A1 * | 10/2015 | Tachikawa | B60N 2/5825 | 297/408 |
| 2016/0375806 A1 * | 12/2016 | Etienne | B60N 2/5891 | 297/452.38 |
| 2018/0339615 A1 * | 11/2018 | Clauser | B60N 2/5841 | |

\* cited by examiner

US 10,604,040 B2

SEAT FOR A VEHICLE

TECHNICAL FIELD

The various embodiments relate to vehicles and vehicle seats with trim covers attached thereto.

BACKGROUND

Vehicles may include seats with trim covers attached thereto. The seats may also include trim fasteners for securing the trim cover to the seat.

SUMMARY

According to at least one embodiment, a seat for a vehicle includes a seatback support structure including a main portion having a first side and a second side disposed opposite the first side, and a flange that projects from the main portion in a direction away from the first side, and that defines a hole extending through the flange for receiving a headrest post. The seat further includes a trim cover disposed over at least a portion of the seatback support structure and a trim fastener attached to the trim cover for securing the trim cover to the flange of the seatback support structure. The trim fastener has two opposing side portions and a cavity therebetween for receiving the flange.

According to another embodiment, a seat for a vehicle includes a seat support structure having a main portion and a flange projecting away from the main portion and a trim cover disposed over at least a portion of the seat support structure. The seat further includes a trim fastener attached to the trim cover for securing the trim cover to the flange of the seat support structure. The trim fastener has two spaced apart side portions for receiving the flange therebetween such that one of the side portions of the trim fastener is disposed within a recessed area formed in a surface of the flange.

According to another embodiment, a seat for a vehicle includes a seatback support structure having a main portion and a flange that projects away from the main portion, and that defines a hole extending through the flange for receiving a headrest post. The seat further includes a trim cover disposed over at least a portion of the seatback support structure and a trim fastener coupled to the trim cover for securing the trim cover to the flange of the seatback support structure. The trim fastener has two opposing side portions and a cavity therebetween for receiving the flange. Each side portion of the trim fastener has a cutout formed in an edge of the respective side portion for accommodating the hole in the flange.

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Figure 1:
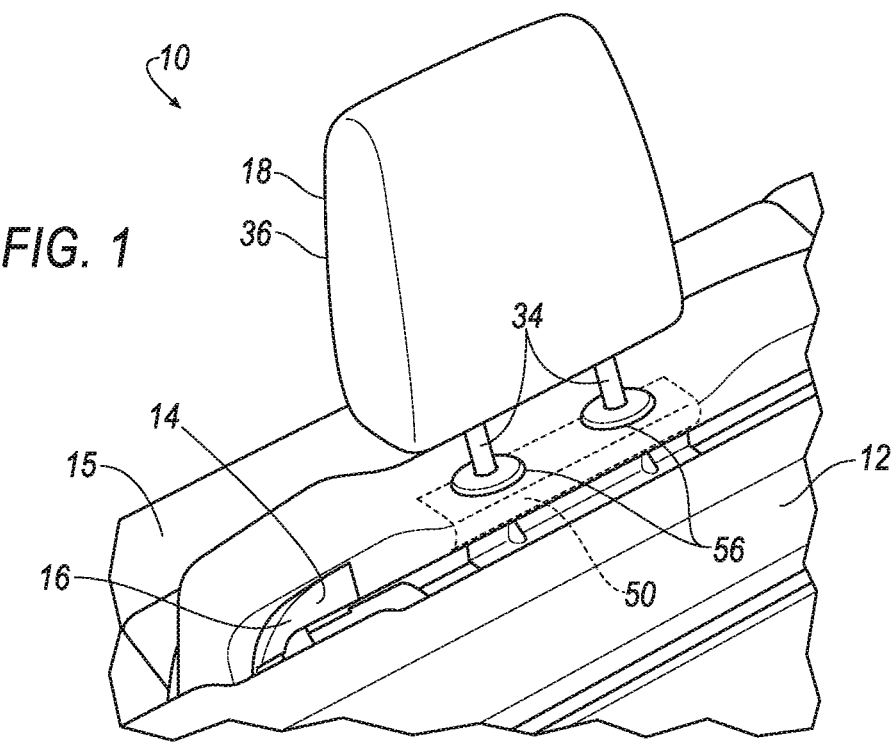
FIG. 1 is a fragmentary perspective view of a seat for a vehicle.
Figure 2:
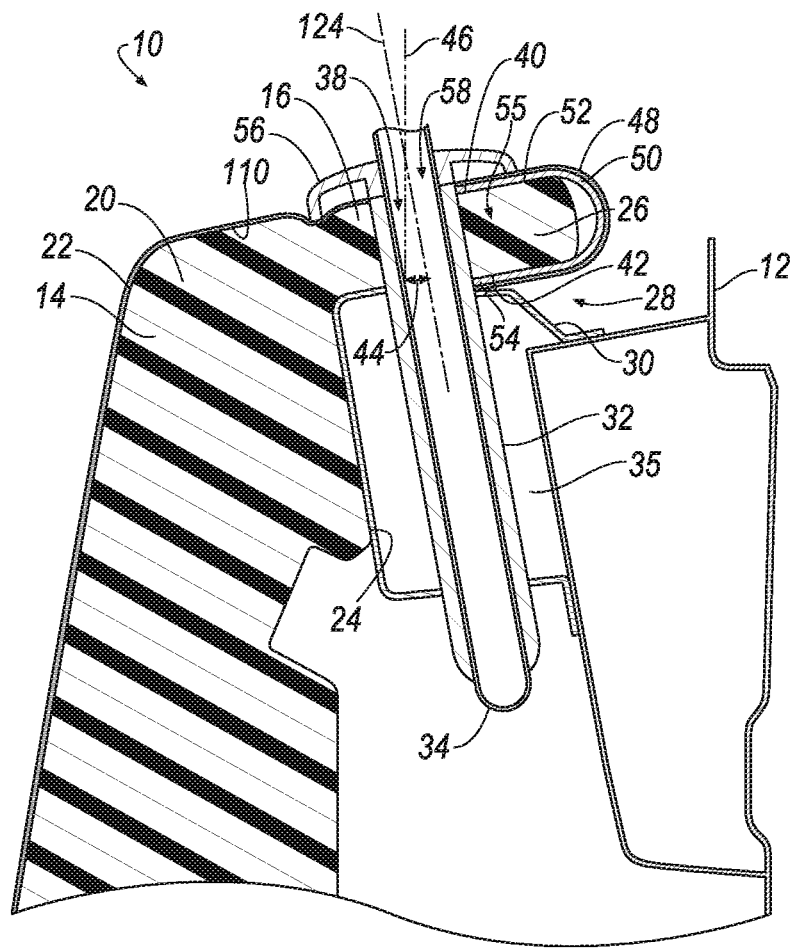
FIG. 2 is a fragmentary cross-sectional view of the seat illustrated in FIG. 1.

FIG. 1 is a fragmentary perspective view of a seat 10 for a vehicle. FIG. 2 is a fragmentary cross-sectional view of the seat 10 illustrated in FIG. 1. In the illustrated embodiment, the seat 10 is a rear seat in a motor vehicle with a cab wall 12, such as a truck. The seat 10 may include a support structure 14, which is a seatback support structure 14 of a seatback in the illustrated embodiment. The support structure 14 may be in other portions of the seat 10 in other embodiments.

The seatback support structure 14 may serve as a base onto which other parts couple to form the seat 10. The seatback support structure 14 may be fixed or pivotable relative to a seat bottom 15 that may be disposed at a lower end (not shown) of the seatback support structure 14 that is opposite an upper end 16 of the seatback support structure 14 adjacent a headrest 18 of the seat 10. Upon being mounted to the vehicle, the headrest 18 of the seat 10 may be coupled to the upper end 16 of the seatback support structure 14. Referring to FIG. 2, the seatback support structure 14 may have a main portion 20 with a side 22 and a side 24 disposed opposite the side 22, and a projection or flange 26 projecting away from the main portion 20. The flange 26 may project from the side 24 in a direction away from the side 22. In the illustrated embodiment, the side 22 is a front side for engaging with an occupant, and the side 24 is a rear side facing the cab wall 12. The seatback support structure 14 may be constructed of an energy-absorbing foam. In one embodiment, the seatback support structure 14 may comprise expanded polypropylene (EPP) foam. The seatback support structure 14 may be coupled to polypropylene plastic in some embodiments.

As shown in FIG. 2, the seat 10 may define a seatback cavity 28 for receiving a headrest bracket 30 that is mounted to the cab wall 12. In one embodiment, the flange 26 and side 24 may define the seatback cavity 28. The headrest bracket 30 may be configured to receive guides 32 and posts 34 of the headrest 18 (FIG. 1) to secure the headrest 18 to the vehicle. In one embodiment, the headrest bracket 30 defines a headrest bracket cavity 35 through which the guides 32 and posts 34 may extend when mounted to the vehicle. The seatback cavity 28 may be adjacent the flange 26 such that the flange 26 bounds a portion of the seatback cavity 28. When mounted to the vehicle, the flange 26 may be disposed over and above the headrest bracket 30 and adjacent the cab wall 12 such that the headrest bracket cavity 35 overlaps or coincides with a portion of the seatback cavity 28. As such, the seatback cavity 28 may include the headrest bracket cavity 35 in one embodiment. The headrest guides 32 and posts 34 may extend through the flange 26 and headrest bracket 30 such that ends of the guides 32 and posts 34 opposite a main portion 36 (FIG. 1) of the headrest 18 protrude outside of (e.g., below) the headrest bracket 30 into a lower portion of the seatback cavity 28. Furthermore, the headrest bracket 30 may abut or be adjacent to the side 24 of the seatback support structure 14, as shown in FIG. 2.

Still referring to FIG. 2, a top of the seat 10 adjacent the headrest 18 may be defined by the flange 26. The flange 26 may define through-holes or holes 38 (also shown in FIG. 3 described below) extending through the flange 26 for receiving the guides 32 and posts 34, such that the guides 32 and posts 34 couple with the headrest bracket 30 disposed below the flange 26. In one embodiment, the holes 38 may extend between upper and lower surfaces 40, 42 of the flange 26. In the illustrated embodiment, each of the holes 38 extends at an angle 44 (relative to a vertical axis 46), such that the headrest guides 32 and posts 34 are disposed at the angle 44 when mounted to the vehicle.

The flange 26 may also be used in attaching a trim cover 48 to the seatback support structure 14, which will be described in greater detail below. The trim cover 48 may be disposed over at least a portion of the seatback support structure 14. In one embodiment, the trim cover 48 may be disposed over a top portion of the seatback support structure 14. The trim cover 48 may be disposed over the side 22 of the seatback support structure 14 and extend over and around the flange 26. The trim cover 48 may be leather, vinyl, or any other suitable material.

The seat 10 may also include a trim fastener 50 coupled or attached to the trim cover 48 for securing the trim cover 48 to the flange 26 of the seatback support structure 14. As will be described in more detail below, the trim fastener 50 may have two opposing side portions 52, 54 and a cavity 55 therebetween for receiving the flange 26 of the seatback support structure 14.

The seat may also include headrest caps 56 that may be used to cover the holes in the trim cover 48 for aesthetic purposes. The caps 56 and guides 32 along with other components not illustrated may be used to secure the headrest 18 to the vehicle. In the illustrated embodiment, the headrest caps 56 are coupled to the guides 32 and rest on top of the trim cover 48. Each of the headrest caps 56 may define a hole 58 that aligns with the respective hole 38 in the flange 26. Each of the headrest posts 34 may extend through the respective headrest cap 56 and into the respective guide 32 which extends through the respective hole 38 in the flange 26. In one embodiment, the headrest cap 56 is generally circular in shape and circumferentially surrounds the headrest post 34 when mounted thereto.

In one embodiment, the trim cover 48 may first be attached to the seatback support structure 14 by attaching the trim fastener 50 to the trim cover 48 and sliding or otherwise positioning the trim fastener 50 over the flange 26 of the seatback support structure 14. The seat 10 with seatback support structure 14 may then be mounted to the vehicle by aligning the headrest bracket 30 with the seatback cavity 28. The guides 32 may be inserted through the holes 38 and into the headrest bracket 30 with the caps 56 resting on top of the trim cover 48. Next, the headrest 18 may be mounted within the vehicle by inserting the headrest posts 34 through the caps 56 and guides 32.

Figure 3:
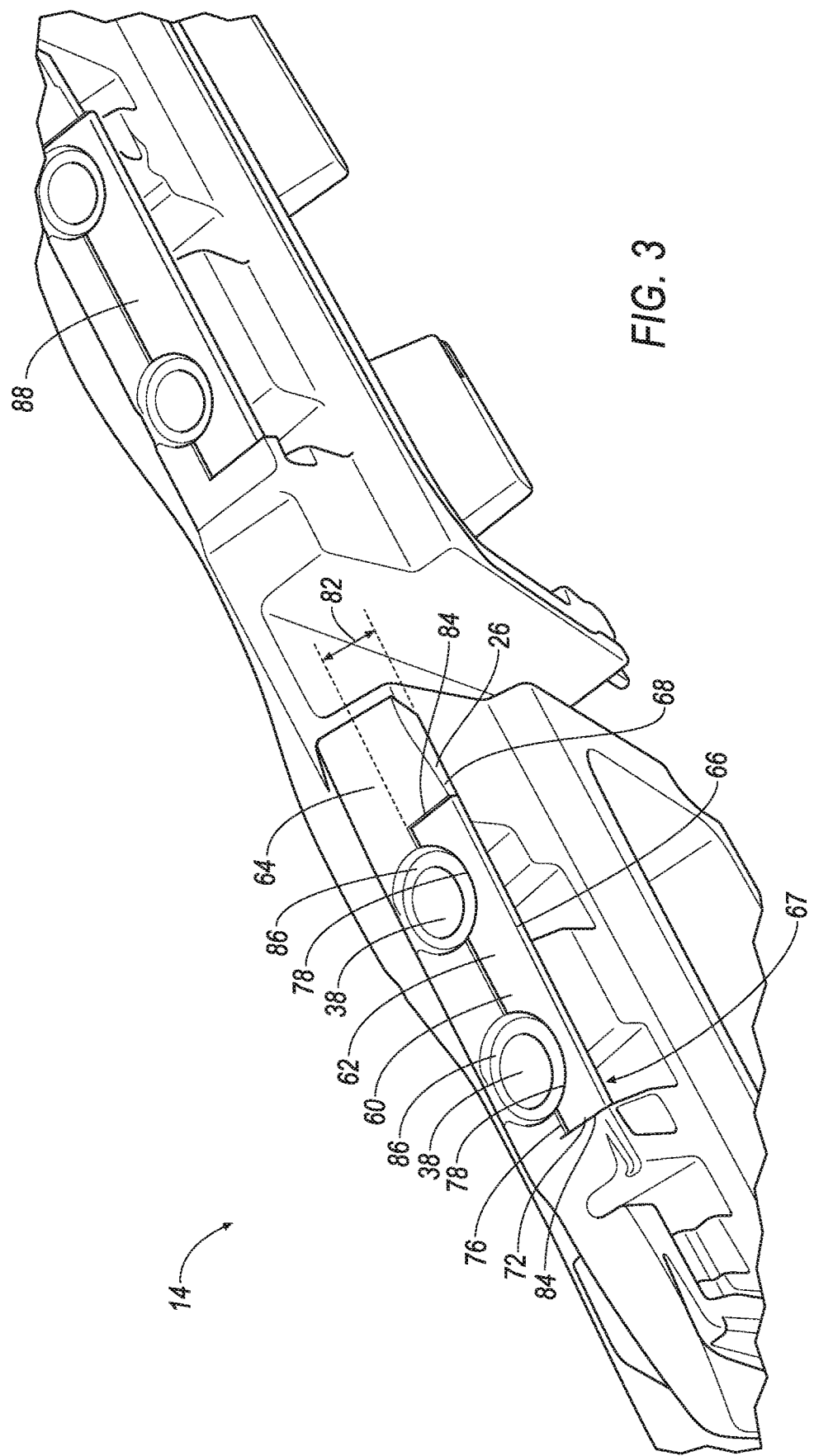
FIG. 3 is a fragmentary perspective view of a seatback support structure of the seat illustrated in FIG. 1.

FIG. 3 is a fragmentary perspective view of the seatback support structure 14 illustrated in FIG. 1. In the illustrated embodiment, the flange 26 of the seatback support structure 14 has a recessed area 60 formed in at least one surface thereof for receiving at least one side of the trim fastener 50 (FIG. 1) such that at least one side of the trim fastener 50 is disposed within the recessed area 60. In the illustrated embodiment, the recessed area 60 has a portion 62 that is formed in an upper surface 64 of the flange 26 and a portion 66 that is formed in a side surface 68 of the flange 26 extending between the upper and lower surfaces 64, 67, such that the side portion 52 of the trim fastener 50 may be disposable within the portion 62, and a base 70 of the trim fastener 50 extending between and joining the opposing side portions 52, 54 may be disposable within the portion 66 (trim fastener 50 shown in FIGS. 4-6 below). In one embodiment, an outline or perimeter 72 of the recessed area 60 may follow or conform to a corresponding outline or perimeter 74 (FIG. 5) of the trim fastener 50 to aid in aligning the trim fastener 50 onto the flange 26. The portion 62 of the recessed area 60 may extend from the portion 66 formed in the side surface 68 of the flange 26 inward toward the holes 38 such that an edge 76 of the portion 62 of the recessed area 60 opposite the side surface 68 of the flange 26 follows the shape of a portion of the holes 38. As such, the edge 76 may be adjacent the holes 38 and have arcuate portions 78 to accommodate the holes 38. The edge 76 may also have straight portions outside of and between the holes 38 such that the recessed area 60 extends beyond the holes 38. The straight portions may be disposed at the same distance 82 from the end of the flange 26.

Still referring to FIG. 3, the holes 38 may be spaced apart from one another such that the holes 38 are disposed between lateral ends 84 of the recessed area 60. The holes 38 may be positioned such that portions of the holes 38 extend beyond the edge 76 of the recessed area 60. The flange 26 may also define grooves 86 formed in the upper surface 64. Each of the grooves 86 may be circular in shape and extend around the respective hole 38. In the illustrated embodiment, the edge 76 of the recessed area 60 abuts the outer perimeters of the grooves 86. Each of the grooves 86 may extend to a depth greater than that of the recessed area 60. Although the depth of the recessed area 60 is illustrated as being uniform throughout both portions 62, 66, the depth of the recessed area 60 may be nonuniform in other embodiments. Also shown in FIG. 3 is another recessed area 88 for an adjacent headrest that is similar in shape to the recessed area 60 but is more elongated to accommodate a wider spacing between the holes for the adjacent headrest posts. As such, the recessed area 88 may be configured to receive a trim fastener that is wider in shape than the trim fastener 50 illustrated in FIGS. 1-2.

Figure 4:
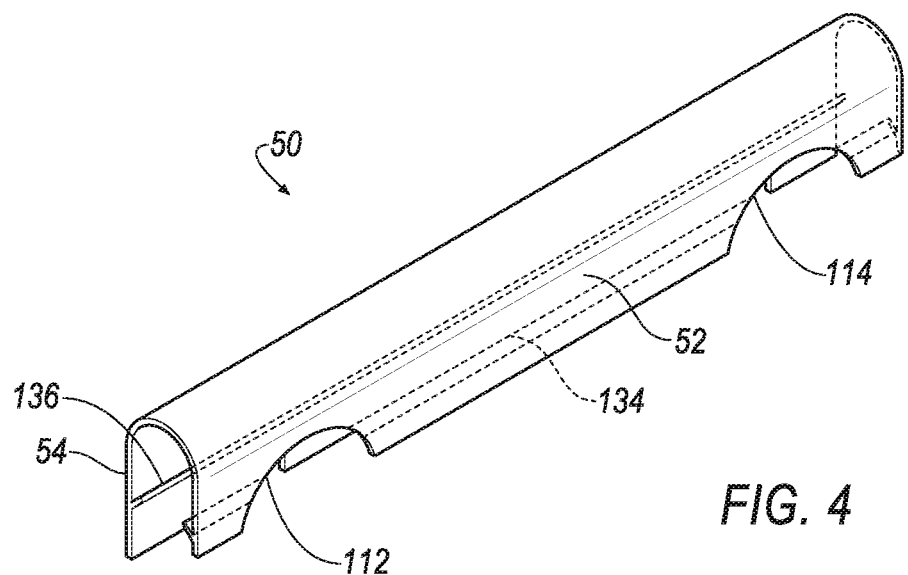
FIG. 4 is a perspective view of a trim fastener of the seat illustrated in FIGS. 1-2.
Figure 5:
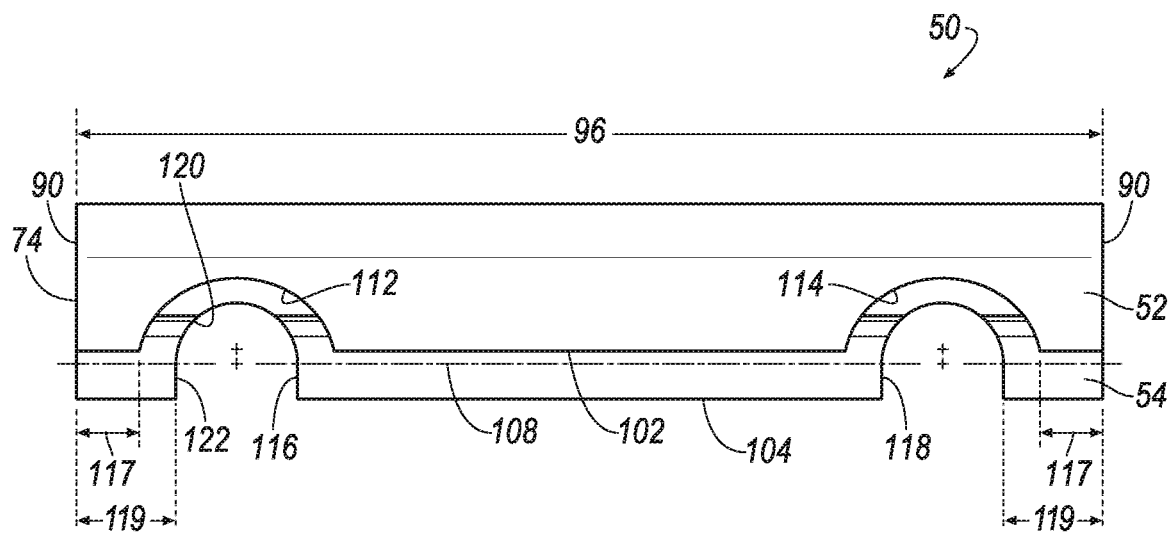
FIG. 5 is a top plan view of the trim fastener of FIG. 4.
Figure 6:
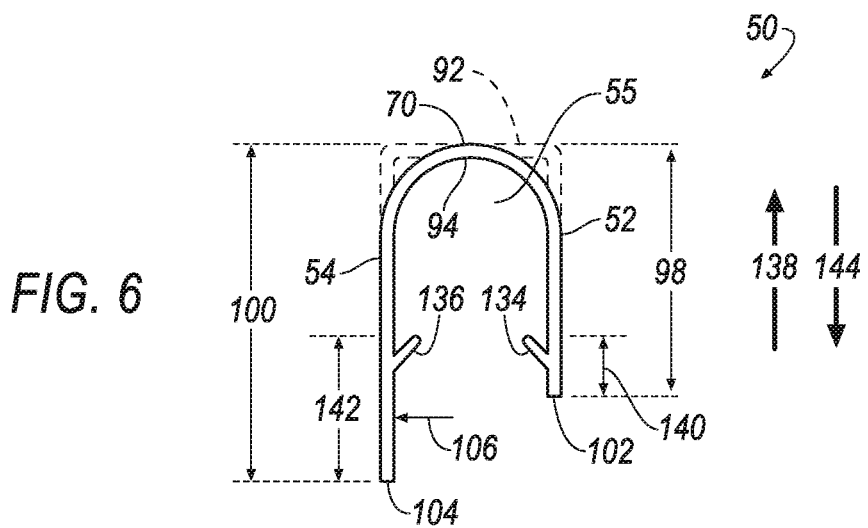
FIG. 6 is a side elevational view of the trim fastener of FIG. 4.

FIG. 4 is a perspective view of the trim fastener 50 illustrated in FIGS. 1-2. FIG. 5 is a top plan view of the trim fastener 50 of FIG. 4. FIG. 6 is a side elevational view of the trim fastener 50 of FIG. 4. With particular reference to FIG. 6, the trim fastener 50 may be shaped to define the cavity 55 for receiving the flange 26 (FIG. 2) of the seatback support structure 14. The trim fastener 50 may be disposed within the recessed area 60 of the flange 25 when coupled or attached thereto such that each lateral end 90 of the trim fastener 50 is disposed adjacent the corresponding lateral end 84 of the recessed area 60.

Referring to FIG. 6, the trim fastener 50 may have two opposing side portions 52, 54 and the base 70 extending between and joining the side portions 52, 54. Each of the side portions 52, 54 may have an inner surface and an outer surface, the inner surfaces being disposed adjacent to and defining the cavity 55. The side portions 52, 54 may be disposed parallel to one another. In other embodiments, each of the side portions 52, 54 may be biased or disposed at an angle toward the other. The base 70, in cross-section, may be semicircular in shape or be generally rectangular in shape, as depicted by reference numeral 92. The base 70 may be shaped to accommodate the shape of the side surface 68 of the flange 26 or of the portion 66 of the recessed area 60 of the flange 26 (flange 26 and recessed area 60 shown in FIG. 3). In one embodiment, at least a portion of an inner surface 94 of the base 70 abuts the side surface 68 of the flange 26 (or abuts the portion 66 of the recessed area 60 if the recessed area 60 is formed in the side surface 68) when attached thereto.

With reference to FIG. 5, the side portions 52, 54 and base 70 have the same length 96. Referring to FIG. 6, each of the side portions 52, 54 may extend a distance 98, 100, respectively from the base 70. In the illustrated embodiment, the distances 98, 100 are non-uniform such that edges 102, 104 of the side portions 52, 54, respectively, are parallel to and offset from one another. The side portion 52 may be the short side portion, and the side portion 54 may be the long side portion to aid in stitching the trim fastener 50 to the trim cover 48 (FIG. 2). A stitching needle may be positioned as depicted by arrow 106 to stitch the side portion 54 to the trim cover 48. As such, by having a short side portion 52 and long side portion 54, the stitching needle may contact the side portion 54 without interfering with the side portion 52 or with the base 70. FIG. 5 illustrates a stitch line 108 where the trim fastener 50 may be coupled or attached to the trim cover 48. In one embodiment, the trim fastener 50 may be coupled or attached to an underside 110 or B-side of the trim cover 48 (FIG. 2). One of ordinary skill in the art will understand that in other embodiments, the side portions 52, 54 may extend to the same distance 98 or 100, and/or the trim fastener 50 may be coupled or attached to the trim cover 48 at other locations along the trim fastener 50.

With reference to FIG. 5, each side portion 52, 54 of the trim fastener 50 may have cutouts 112, 114, 116, 118 formed in the edges 102, 104 of the respective side portions 52, 54 for accommodating the holes 38 in the flange 26 which may receive the guides 32 when mounted to the vehicle (flange 26 and guides 32 shown in FIG. 2). The cutouts 112, 114, 116, 118 may also aid in alignment upon inserting the headrest guides 32 and caps 56 in the holes 38. The cutouts 112, 114, 116, 118 may be arcuate in shape and be spaced apart from one another in accordance with the space between the holes 38 in the flange 26. In the illustrated embodiment, the side portion 52 has two cutouts 112, 114, and the side portion 54 has two cutouts 116, 118. The cutouts 112, 114 may be larger than the cutouts 116, 118 to accommodate the headrest caps 56. In the illustrated embodiment, the cutouts 112, 114 are generally semicircular in shape and are spaced a distance 117 from the respective end 90 of the trim fastener 50. The cutouts 116, 118 may generally have an elongated semicircular shape and be spaced a distance 119 from the respective end 90 of the trim fastener 50. To allow proper horizontal alignment of the headrest posts, the center points of the corresponding cutouts 112, 114, 116, 118 may be spaced the same distance from the respective end 90. In the illustrated embodiment, the cutouts 116, 118 have a semicircular portion 120 and a straight portion 122 that is adjacent the edge 104. To accommodate the angled position of the headrest guides 32 and posts 34 inserted therethrough, the cutouts 112, 114, 116, 118 may be configured in accordance with the respective headrest post axis 124 (FIG. 2). In one embodiment, the post axes 124, which may be the central longitudinal axes of the guides 32 and posts 34 illustrated in FIG. 2, may extend through the center points of the respective cutouts 112, 114, 116, 118, each center point being the center of the circle corresponding to the respective cutout 112, 114, 116, 118.

With reference to FIG. 6, the trim fastener may further include one or more barbs 134, 136, with each barb 134, 136 protruding into the cavity 55 from an inner surface of the respective side portion 52, 54 for gripping a side or surface 40, 42 (FIG. 2) of the flange 26. In the illustrated embodiment, the barb 134 protrudes from the inner surface of the side portion 52 and grips and contacts the upper surface 40 of the flange 26, and the barb 136 protrudes from the inner surface of the side portion 54 and grips and contacts the lower surface 42 of the flange 26 (flange 26 shown in FIGS. 2-3). Each of the barbs 134, 136 may protrude from the respective side portions 52, 54 in a direction 138 toward the base 70 of the trim fastener 50. As shown in FIG. 4, in the illustrated embodiment, each of the barbs 134, 136 spans across the respective side portion 52, 54 and is interrupted by the respective cutouts 112, 114, 116, 118 in the trim fastener 50 such that each barb 134, 136 has three portions. Referring to FIG. 6, each of the barbs 134, 136 may protrude from the respective side portion 52, 54 and contact the flange 26 at a distance 140, 142 from the respective edge 102, 104 of the trim fastener 50. In the illustrated embodiment, each of the barbs 134, 136 may extend linearly at an angle less than ninety degrees from the respective side portion 52, 54 toward the base 70 of the trim fastener 50. Each of the barbs 134, 136 may protrude in the direction 138 opposite a direction 144 of installation to inhibit movement of the trim fastener 50 in the direction 138 once assembled.

The above configuration may improve alignment of the holes of the trim cover 48 with the holes 38 of the seatback support structure 14 to ease installation of the headrest guides 32 and posts 34. The above configuration may also improve proper placement of the trim fastener 50 over the flange 26 of the seatback support structure 14.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A seat for a vehicle, comprising:
   a seatback support structure including a main portion having a first side and a second side disposed opposite the first side, and a flange that projects from the main portion in a direction away from the first side, and that defines a hole extending through the flange for receiving a headrest post;
   a trim cover disposed over at least a portion of the seatback support structure; and
   a trim fastener attached to the trim cover for securing the trim cover to the flange of the seatback support structure, wherein the trim fastener has two opposing side portions that define a cavity therebetween for receiving the flange, and one of the side portions of the trim fastener has a cutout formed in an edge of the one side portion for accommodating a headrest guide when the headrest guide is inserted into the hole in the flange.

2. The seat of claim 1, wherein the hole extends between upper and lower surfaces of the flange, and the trim fastener has a first barb protruding into the cavity from one of the opposing side portions of the trim fastener for gripping and contacting one of the upper and lower surfaces of flange.

3. The seat of claim 2, wherein the trim fastener has a base joining the two opposing side portions, and the first barb protrudes from one of the opposing side portions of the trim fastener in a direction toward the base.

4. The seat of claim 2, wherein the trim fastener has a second barb protruding into the cavity from the other of the opposing side portions of the trim fastener for gripping the flange.

5. The seat of claim 2, wherein the trim fastener has a base joining the two opposing side portions, and wherein the first barb protrudes from one of the opposing side portions at a distance from an edge of the one side portion opposite the base.

6. The seat of claim 2, wherein the opposing side portions of the trim fastener include a short side portion and a long side portion that is longer than the short side portion, and the first barb protrudes from the long side portion.

7. The seat of claim 1, wherein the trim cover is attached to the trim fastener so that the trim cover does not extend between the trim fastener and the flange.

8. The seat of claim 1, wherein the other of the side portions of the trim fastener has a cutout formed in an edge of the other side portion for accommodating the headrest guide when the headrest guide is inserted into the hole in the flange.

9. A seat for a vehicle, comprising:
a seat support structure having a main portion and a flange projecting away from the main portion, wherein the flange defines a first hole extending between upper and lower surfaces of the flange for receiving a first headrest post of a headrest;
a trim cover disposed over at least a portion of the seat support structure; and
a trim fastener attached to the trim cover for securing the trim cover to the flange of the seat support structure, wherein the trim fastener has two spaced apart side portions for receiving the flange therebetween such that one of the side portions of the trim fastener extends into a recessed area formed in the upper surface of the flange, and wherein the recessed area extends from an end of the flange inward toward the first hole, and an edge of the recessed area opposite the end of the flange has an arcuate portion to accommodate the first hole.

10. The seat of claim 9, wherein the flange of the seat support structure defines a second hole spaced from the first hole and extending between the upper and lower surfaces of the flange for receiving a second headrest post of the headrest.

11. The seat of claim 10, wherein the edge of the recessed area opposite the end of the flange has another arcuate portion to accommodate the second hole.

12. The seat of claim 9, wherein ends of the trim fastener are disposed adjacent to corresponding ends of the recessed area.

13. The seat of claim 9, wherein the opposing side portions of the trim fastener include a short side portion and a long side portion that is longer than the short side portion, such that edges of the opposing side portions are parallel to and offset from one another.

14. A seat for a vehicle, comprising:
a seatback support structure having a main portion and a flange that projects away from the main portion, and that defines a hole extending through the flange for receiving a headrest post;
a trim cover disposed over at least a portion of the seatback support structure; and
a trim fastener coupled to the trim cover for securing the trim cover to the flange of the seatback support structure, wherein the trim fastener has two opposing side portions that define a cavity therebetween for receiving the flange, and wherein each side portion of the trim fastener has a cutout formed in an edge of the respective side portion for accommodating the hole in the flange.

15. The seat of claim 14, wherein the opposing side portions of the trim fastener include a short side portion and a long side portion that is longer than the short side portion, such that the edges of the opposing side portions are parallel to and offset from one another.

16. The seat of claim 14, wherein each of the cutouts is arcuate.

17. The seat of claim 14, wherein the trim fastener has a first barb protruding into the cavity from one of the opposing side portions of the trim fastener for gripping the flange.

18. The seat of claim 17, wherein the trim fastener has a second barb protruding into the cavity from the other of the opposing side portions of the trim fastener for gripping the flange.

19. The seat of claim 18, wherein the first barb spans across the one side portion of the trim fastener and is interrupted by the cutout formed in the one side portion, and the second barb spans across the other side portion of the trim fastener and is interrupted by the cutout formed in the other side portion.

20. The seat of claim 14, wherein the seatback support structure comprises expanded polypropylene foam.

* * * * *